(12) United States Patent
Wu et al.

(10) Patent No.: US 11,463,906 B2
(45) Date of Patent: Oct. 4, 2022

(54) ENHANCEMENTS TO ADVANCED CHANNEL STATE INFORMATION (CSI) REPORTING PROCEDURES

(71) Applicant: QUALCOMM Incorporated, San Diego, CA (US)

(72) Inventors: Liangming Wu, Beijing (CN); Chao Wei, Beijing (CN); Yu Zhang, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 187 days.

(21) Appl. No.: 16/467,882

(22) PCT Filed: Dec. 15, 2017

(86) PCT No.: PCT/CN2017/116489
§ 371 (c)(1),
(2) Date: Jun. 7, 2019

(87) PCT Pub. No.: WO2018/108155
PCT Pub. Date: Jun. 21, 2018

(65) Prior Publication Data
US 2020/0092749 A1    Mar. 19, 2020

(30) Foreign Application Priority Data

Dec. 16, 2016 (WO) ................ PCT/CN2016/110327

(51) Int. Cl.
*H04W 72/04* (2009.01)
*H04W 24/10* (2009.01)
(Continued)

(52) U.S. Cl.
CPC .......... *H04W 28/06* (2013.01); *H04B 7/0626* (2013.01); *H04W 72/042* (2013.01)

(58) Field of Classification Search
None
See application file for complete search history.

(56) References Cited

U.S. PATENT DOCUMENTS

2005/0201474 A1* 9/2005 Cho .................. H04L 1/0027
375/260
2012/0270535 A1 10/2012 Chen et al.
(Continued)

FOREIGN PATENT DOCUMENTS

CN      104247494 A     12/2014
WO      2018006311 A1   1/2018
(Continued)

OTHER PUBLICATIONS

International Search Report and Written Opinion—PCT/CN2017/116489—ISA/EPO—dated Feb. 24, 2018.
(Continued)

*Primary Examiner* — Sai Aung
(74) *Attorney, Agent, or Firm* — Qualcomm Incorporated

(57) ABSTRACT

Methods and apparatus for implementing enhancements to advanced Channel State Information (CSI) reporting procedures are provided. A User Equipment (UE) receives at least one trigger message for reporting advanced CSI by the UE, and takes one or more actions to reduce at least one of feedback overhead or processing at the UE associated with the reporting.

21 Claims, 12 Drawing Sheets

(51) Int. Cl.
*H04B 7/06* (2006.01)
*H04W 28/06* (2009.01)

(56) References Cited

U.S. PATENT DOCUMENTS

| | | | | |
|---|---|---|---|---|
| 2013/0114455 | A1 | 5/2013 | Yoo et al. | |
| 2013/0195008 | A1* | 8/2013 | Pelletier | H04B 7/0417 370/328 |
| 2013/0208604 | A1* | 8/2013 | Lee | H04B 7/0626 370/252 |
| 2014/0086174 | A1* | 3/2014 | Nam | H04W 72/0413 370/329 |
| 2015/0110029 | A1* | 4/2015 | Hwang | H04L 1/0031 370/329 |
| 2015/0381254 | A1* | 12/2015 | Liang | H04B 7/0619 370/329 |
| 2016/0212643 | A1* | 7/2016 | Park | H04L 5/0048 |
| 2019/0245608 | A1* | 8/2019 | Kakishima | H04B 7/0617 |

FOREIGN PATENT DOCUMENTS

| | | |
|---|---|---|
| WO | 2018063048 A1 | 4/2018 |
| WO | 2018103077 A1 | 6/2018 |

OTHER PUBLICATIONS

International Search Report and Written Opinion—PCT/CN2016/110327—ISA/EPO—dated Aug. 25, 2017.
Qualcomm Incorporated: "Enhancements on Beamformed CSI-RS for eFD-MIMO", 3GPP Draft; R1-164428, 3rd Generation Partnership Project (3GPP), Mobile Competence Centre; 650, Route Des-Lucioles; F-06921 Sophia-Antipolis Cedex; France, vol. RAN WG1, No. Nanjing, China; May 14, 2016, XP051096451, Retrieved from the Internet: URL:http://www.3gpp.org/ftp/tsg_ran/WG1_RL1/TSGR1_85/Docs/ [retrieved on May 14, 2016], 5 pages.
Samsung: "Priority Rules for CSI Feedback for eCA", R1-154120, 3GPP TSG RAN WGI #82, Beijing, China, Aug. 24-28, 2015, pp. 1-3.
Qualcomm Incorporated: "Enhancements on Beamformed CSI-RS", 3GPP Draft, 3GPP TSG-RAN WG1 #86, R1-166270, 3rd Generation Partnership Project (3GPP), Mobile Competence Centre, 650, Route Des Lucioles, F-06921, Sophia-Antipolis Cedex, France, vol. RAN WG1, No. Reno, Gothenburg, Sweden, Aug. 22, 2016-Aug. 26, 2016 Aug. 21, 2016 (Aug. 21, 2016), XP051125310, pp. 1-4, Retrieved from the Internet: URL:http://www.3gpp.org/ftp/Meetings_3GPP_SYNC/RAN1/Docs/ [retrieved on Aug. 21, 2016].
Supplementary European Search Report—EP17882229—Search Authority—Munich—dated Jul. 20, 2020.

* cited by examiner

ENHANCEMENTS TO ADVANCED CHANNEL STATE INFORMATION (CSI) REPORTING PROCEDURES

CROSS REFERENCE TO RELATED APPLICATION

This application is a national stage application under 35 U.S.C. 371 of PCT/CN2017/116489, filed Dec. 15, 2017, which claims priority to International Application No. PCT/CN2016/110327, filed Dec. 16, 2016, which is are both assigned to the assignee of the present application and are expressly incorporated by reference in their entireties.

INTRODUCTION

Aspects of the present disclosure relate to wireless communications systems and, more particularly, to enhancements to advanced Channel State Information (CSI) reporting procedures.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (TDMA) systems, orthogonal frequency division multiple access (OFDMA) systems, single-carrier frequency division multiple access (SC-FDMA) systems, and time division synchronous code division multiple access (TD-SCDMA) systems.

A wireless communication network may include a number of Node Bs that can support communication for a number of user equipments (UEs). A UE may communicate with a Node B via the downlink and uplink. The downlink (or forward link) refers to the communication link from the Node B to the UE, and the uplink (or reverse link) refers to the communication link from the UE to the Node B.

These multiple access technologies have been adopted in various telecommunication standards to provide a common protocol that enables different wireless devices to communicate on a municipal, national, regional, and even global level. An example of an emerging telecommunication standard is new radio (NR, e.g., 5G radio access (RA)). NR is a set of enhancements to the LTE mobile standard promulgated by Third Generation Partnership Project (3GPP). It is designed to better support mobile broadband Internet access by improving spectral efficiency, lower costs, improve services, make use of new spectrum, and better integrate with other open standards using OFDMA with a cyclic prefix (CP) on the downlink (DL) and on the uplink (UL) as well as support beamforming, multiple-input multiple-output (MIMO) antenna technology, and carrier aggregation. However, as the demand for mobile broadband access continues to increase, there exists a need for further improvements in NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communications by a User Equipment (UE). The method generally includes receiving at least one trigger message for reporting advanced Channel State Information (CSI) by the UE, and taking one or more actions to reduce at least one of feedback overhead or processing at the UE associated with the reporting.

Certain aspects of the present disclosure provide a method for wireless communication by a Base Station (BS). The method generally includes determining to send at least one trigger message to receive an advanced. Channel State Information (CSI) report from at least one User Equipment (UE), taking at least one action to reduce at least one of feedback overhead or processing at the at least one UE associated with the advanced CSI report, and sending the at least one trigger message based on the at least one action.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
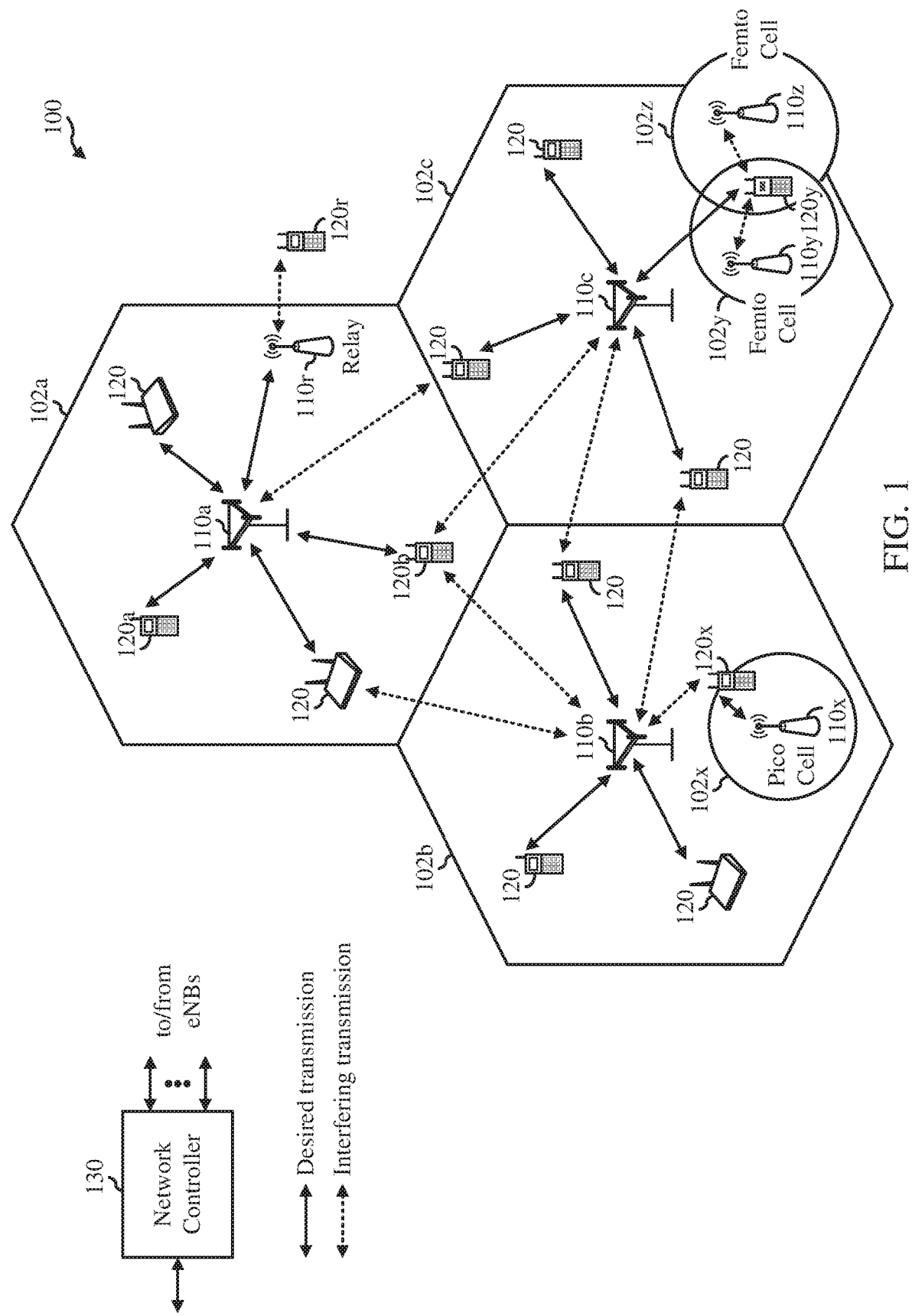
FIG. 1 is a block diagram conceptually illustrating an example telecommunications system, according to aspects of the present disclosure.

In 3GPP Release 13 Full-Dimension MIMO (FD-MIMO), an official name for the MIMO enhancement in 3GPP, class A and class B type CSI (Channel State Information) feedback assumes PMI (Pre-Coding Matrix Indicator) constructed from a single DFT (Discrete Fourier Transform) beam or single beam selection. Thus, an issue with the legacy CSI reporting is that the legacy CSI reporting is insufficient to reflect channel information, which in turn degrades the SU/MU-MIMO performance, especially at larger antenna arrays.

Advanced CSI (Adv-CSI) reporting is thus proposed in Release 14 to improve CSI accuracy by combining multiple beams (e.g. DFT beams) based on power and/or phasing based codebook.

However, there are some drawbacks associated with advanced CSI reporting including large feedback overhead and increased UE processing complexity as compared to legacy CSI reporting. In certain aspects, these drawbacks are attributed, at least in part, to large codebook sizes utilized for advanced CSI reporting. In certain aspects, UE processing complexity may increase when aperiodic advanced CSI triggering is being used to trigger advanced CSI reports at the UE. For example, in case of aperiodic advanced CSI triggering, the UE first decodes the UL grant to know the presence of aperiodic advanced CSI triggering before calculating the advanced CSI. In certain aspects, UE processing complexity may further increase when advanced CSI is triggered in multiple contiguous subframes where the UE calculates multiple advanced CSIs simultaneously. In an aspect the multiple contiguous triggers also increase total feedback overhead. In certain aspects, a substantial increase in UE processing complexity as well as an increase in feedback overhead may be expected when advanced CSI is enabled for a set of serving cells or multiple CSI processes.

Certain aspects of the present disclosure discuss techniques to reduce feedback overhead and/or UE processing complexity by relaxing or limiting one or more parameters associated with reporting advanced CSI.

In certain aspects, a User Equipment (UE) may receive at least one trigger message for reporting advanced CSI by the UE, and take one or more actions to reduce at least one of feedback overhead or processing at the UE associated with the reporting. A Base Station (BS) may send at least one trigger message to receive an advanced CSI report from at least one UE, and take at least one action to reduce at least one of feedback overhead or processing at the at least one UE associated with the advanced. CSI report. The BS may send the at least one trigger message based on the at least one action.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting and the scope of the disclosure is being defined by the appended claims and equivalents thereof.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA, UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies.

For clarity, while aspects may be described herein using terminology commonly associated with 3G and/or 4G wireless technologies, aspects of the present disclosure can be applied in other generation-based communication systems, such as 5G and later, including NR technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may include Enhanced mobile broadband (eMBB) targeting wide bandwidth (e.g., 80 MHz beyond), millimeter wave (mmW) targeting high carrier frequency (e.g., 60 GHz), massive MTC (mMTC) targeting non-backward compatible MTC techniques, and mission critical targeting ultra reliable low latency communications (URLLC). For these general topics, different techniques are considered, such as coding, low-density parity check (LDPC), and polar codes. NR cell may refer to a cell operating according to the new air interface or fixed transport layer. A NR Node B (e.g., 5G Node B) may correspond to one or multiple transmission reception points (TRPs).

NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals in some cases DCells may transmit SS. TRPs may transmit downlink signals to UEs indicating the cell type. Based on the cell type indication, the UE may communicate with the TRP. For example, the UE may determine TRPs to consider for cell selection, access, handover, and/or measurement based on the indicated cell type.

In some cases, the UE can receive measurement configuration from the RAN. The measurement configuration information may indicate ACells or DCells for the UE to measure. The UE may monitor/detect measurement reference signals from the cells based on measurement configuration information. In some cases, the UE may blindly detect MRS. In some cases the UE may detect MRS based on MRS-IDs indicated from the RAN. The UE may report the measurement results.

Example Wireless Communications System

FIG. 1 illustrates an example wireless network 100 in which aspects of the present disclosure may be performed. For example, the wireless network may be new radio (NR) or 5G network. In certain aspects, a User Equipment (UE) (e.g., UE 102) may receive at least one trigger message for reporting advanced CSI by the UE, and take one or more actions to reduce at least one of feedback overhead or processing at the UE associated with the reporting. A Base Station (BS) (e.g., Node B 110) may send at least one trigger message to receive an advanced CSI report from at least one UE, and take at least one action to reduce at least one of feedback overhead or processing at the at least one UE associated with the advanced CSI report. The BS may the at least one trigger message based on the at least one action.

Figure 5:
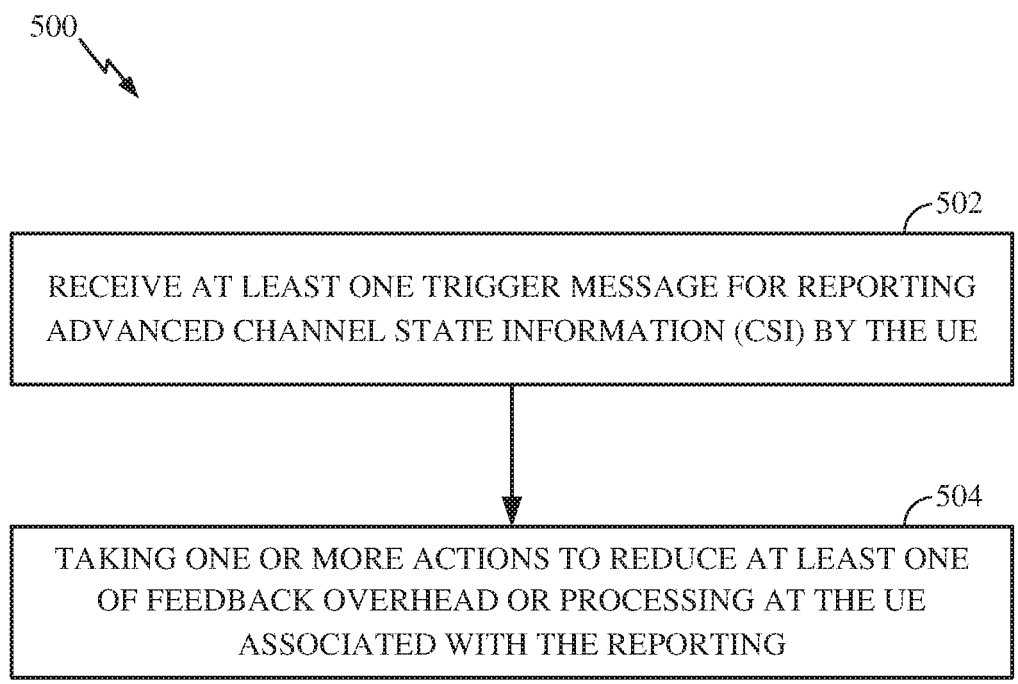
FIG. 5 illustrates example operations 500 performed, for example, by a UE to enhance advanced CSI reporting procedures, in accordance with certain aspects of the present disclosure.

Each of the UEs 120 may be configured to perform the operations 500 of FIG. 5. Each of the Node Bs 110 may be configured to perform the operations 600 of FIG. 6. Furthermore, the Node Bs 110 and the UEs 120 may be configured to perform other aspects described for enhancing PDCP re-establishment procedures.

The system illustrated in FIG. 1 may be, for example, a long term evolution (LTE) network. The wireless network 100 may include a number of Node Bs (e.g., eNodeBs, eNBs, 5G Node B. etc) 110 and other network entities. A Node B may be a station that communicates with the UEs and may also be referred to as a base station, an access point, or a 5G Node B.

Each Node B 110 may provide communication coverage for a particular geographic area. In 3GPP, the term "cell" can refer to a coverage area of an Node B and/or an Node B subsystem serving this coverage area, depending on the context in which the term is used.

A Node B may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A Node B for a macro cell may be referred to as a macro Node B. A Node B for a pico cell may be referred to as a pico Node B. A Node B for a femto cell may be referred to as a femto Node B or a home Node B. In the example shown in FIG. 1, the Node Bs 110a, 110b and 110c may be macro Node Bs for the macro cells 102a, 102b and 102c, respectively. The Node B 110x may be a pico Node B for a pico cell 102x. The Node Bs 110y and 110z may be femto Node Bs for the femto cells 102y and 102z, respectively. A Node B may support one or multiple (e.g., three) cells.

The wireless network 100 may also include relay stations. A relay station is a station that receives a transmission of data and/or other information from an upstream station (e.g., a Node B or a UE) and sends a transmission of the data and/or other information to a downstream station (e.g., a UE or a Node B). A relay station may also be a UE that relays transmissions for other UEs. In the example shown in FIG. 1, a relay station 110r may communicate with the Node B 110a and a UE 120r in order to facilitate communication between the Node B 110a and the UE 120r. A relay station may also be referred to as a relay Node B, a relay, etc.

The wireless network 100 may be a heterogeneous network that includes Node Bs of different types, e.g., macro Node Bs, pico Node Bs, femto Node Bs, relays, transmission reception points (TRPs), etc. These different types of Node Bs may have different transmit power levels, different coverage areas, and different impact on interference in the wireless network 100. For example, macro Node Bs may have a high transmit power level (e.g., 20 Watts) whereas pico Node Bs, femto Node Bs and relays may have a lower transmit power level (e.g., 1 Watt).

The wireless network 100 may support synchronous or asynchronous operation. For synchronous operation, the Node Bs may have similar frame timing, and transmissions from different Node Bs may be approximately aligned in time. For asynchronous operation, the Node Bs may have different frame timing, and transmissions from different Node Bs may not be aligned in time. The techniques described herein may be used for both synchronous and asynchronous operation.

A network controller 130 may couple to a set of Node Bs and provide coordination and control for these Node Bs. The network controller 130 may communicate with the Node Bs 110 via a backhaul. The Node Bs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a terminal, a mobile station, a subscriber unit, a station, etc. A UE may be a cellular phone, a smart phone, a personal digital assistant (PDA), a wireless modem, a wireless communication device, a handheld device, a laptop computer, a cordless phone, a wireless local loop (WLL) station, a tablet, a netbook, a smart book, a drone, a robot/robotic device, a wearable device (e.g., smart glasses, smart watch, smart wristband, smart clothing, smart ring, smart jewelry), a monitor, a meter, a camera, a navigation/positioning device, a healthcare/medical device, etc. A UE may be able to communicate with macro Node Bs, pico Node Bs, femto Node Bs, relays, etc. In FIG. 1, a solid line with double arrows indicates desired transmissions between a UE and a serving Node B, which is a Node B designated to serve the UE on the downlink and/or uplink. A dashed line with double arrows indicates interfering transmissions between a UE and a Node B.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively. New radio (NR) may use a different air interface, other than OFDM-based. NR networks may include entities such central units or distributed units.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. A single component carrier bandwidth of 100 MHZ may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. MIMO transmissions with preceding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such central units or distributed units.

Figure 2:
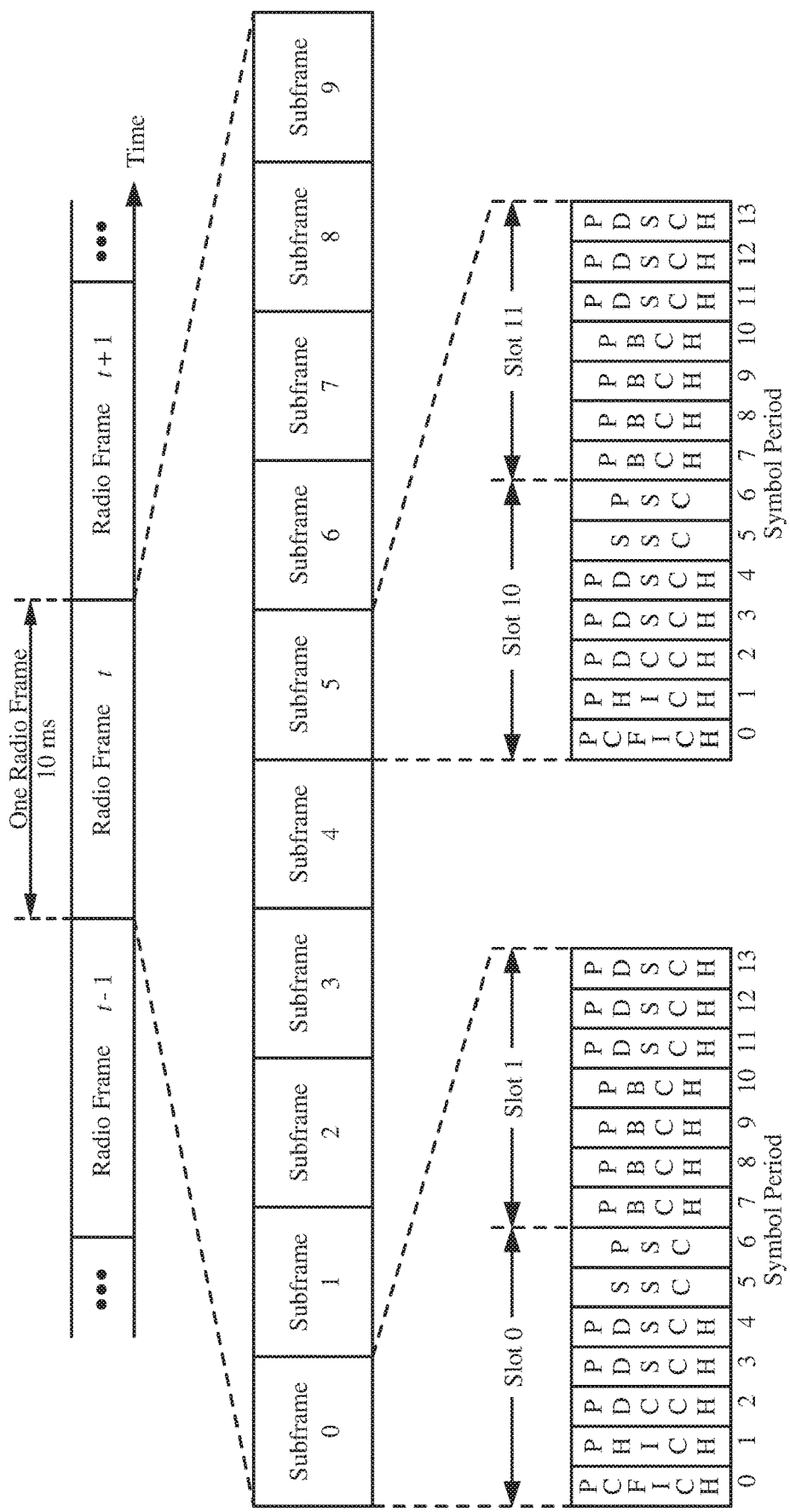
FIG. 2 is a block diagram conceptually illustrating an example downlink frame structure in a telecommunications system, according to aspects of the present disclosure.

FIG. 2 shows a down link (DL) frame structure used in a telecommunication systems (e.g., LTE). The transmission timeline for the downlink may be partitioned into units of radio frames. Each radio frame may have a predetermined duration (e.g., 10 milliseconds (ms)) and may be partitioned into 10 sub-frames with indices of 0 through 9. Each sub-frame may include two slots. Each radio frame may thus include 20 slots with indices of 0 through 19. Each slot may include L symbol periods, e.g., 7 symbol periods for a normal cyclic prefix (as shown in FIG. 2) or 14 symbol periods for an extended cyclic prefix. The 2L symbol periods in each sub-frame may be assigned indices of 0 through 2L-1. The available time frequency resources may be partitioned into resource blocks. Each resource block may cover N subcarriers (e.g., 12 subcarriers) in one slot.

In LTE, a Node B may send a primary synchronization signal (PSS) and a secondary synchronization signal (SSS) for each cell in the Node B. The primary and secondary synchronization signals may be sent in symbol periods 6 and 5, respectively, in each of sub-frames 0 and 5 of each radio frame with the normal cyclic prefix, as shown in FIG. 2. The synchronization signals may be used by UEs for cell detection and acquisition. The Node B may send a Physical Broadcast Channel (PBCH) in symbol periods 0 to 3 in slot 1 of sub-frame 0. The PBCH may carry certain system information.

The Node B may send a Physical Control For Indicator Channel (PCFICH) in only a portion of the first symbol period of each sub-frame, although depicted in the entire first symbol period in FIG. 2. The PCFICH may convey the number of symbol periods (M) used for control channels, where M may be equal to 1, 2 or 3 and may change from sub-frame to sub-frame. M may also be equal to 4 for a small system bandwidth, e.g., with less than 10 resource blocks. In the example shown in FIG. 2, M=3. The Node B may send a Physical HARQ Indicator Channel (PHICH) and a Physical Downlink Control Channel (PDCCH) in the first M symbol periods of each sub-frame (M=3 in FIG. 2). The PHICH may carry information to support hybrid automatic retransmission (HARQ). The PDCCH may carry information on uplink and downlink resource allocation for UEs and power control information for uplink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The Node B may send a Physical Downlink Shared Channel (PDSCH) in the remaining symbol periods of each sub-frame. The PDSCH may carry data for UEs scheduled for data transmission on the downlink.

The various signals and channels in LTE are described in 3GPP TS 36.211, entitled "Evolved Universal Terrestrial Radio Access (E-UTRA); Physical Channels and Modulation," which is publicly available.

The Node B may send the PSS, SSS and PBCH in the center 1.08 MHz of the system bandwidth used by the Node B. The Node B may send the PCFICH and PHICH across the entire system bandwidth in each symbol period in which these channels are sent. The Node B may send the PDCCH to groups of UEs in certain portions of the system bandwidth. The Node B may send the PDSCH to specific UEs in specific portions of the system bandwidth. The Node B may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. A Node B may send the PDCCH to the UE in any of the combinations that the UE will search.

A UE may be within the coverage of multiple Node Bs. One of these Node Bs may be selected to serve the UE. The serving Node B may be selected based on various criteria such as received power, path loss, signal-to-noise ratio (SNR), etc.

Figure 2A:
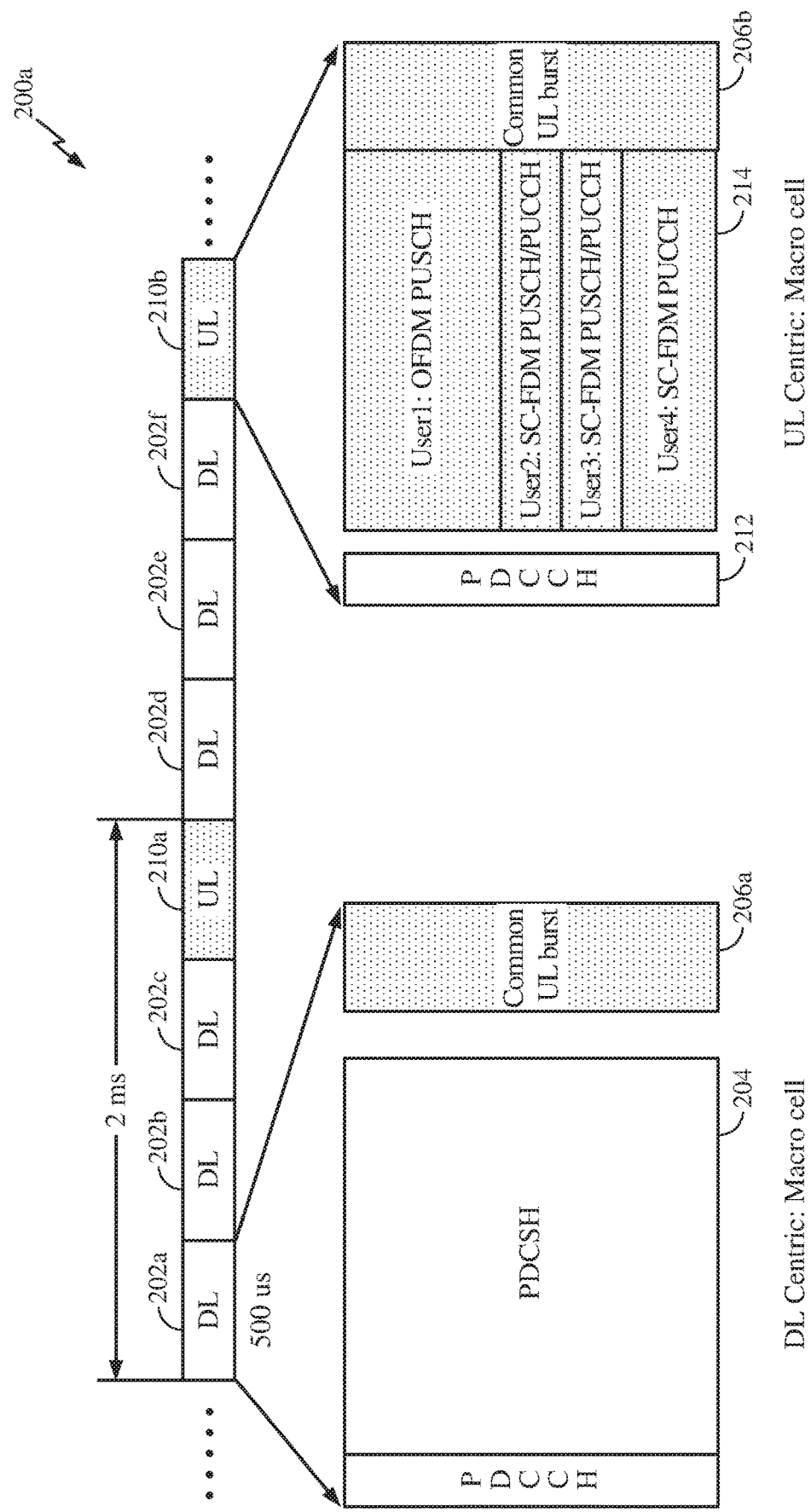
FIG. 2A shows an exemplary transmission timeline that may be used in a TDD system in which one or more aspects of the present disclosure may be practiced.

In some networks (e.g., NR or 5G networks), devices may communicate by transmitting signals in different locations of a slot, e.g., such as in DL centric slot and/or UL centric slot. A DL centric slot may be used for transmitting DL data from the base station to one or more UEs, and a UL centric slot may be used for transmitting UL data from one or more UEs to a base station. A UL-centric slot is a slot with a majority of the OFDM symbols used for UL transmission. It typically has few DL symbols at the beginning (e.g. 2 symbols), then a guard duration, then UL symbols. A DL-centric slot is a slot with a majority of OFDM symbols used for DL transmission. It typically has most of the first symbols on DL (e.g. 12 symbols), then a guard interval, then a few UL symbols (1-2 symbols). FIG. 2A shows another exemplary transmission timeline 200a that may be used in a TDD system in which one or more aspects of the present disclosure may be practiced. The timeline includes a plurality DL-centric slots 202 (e.g., subframes) that have most symbols 204 dedicated to DL transmissions (e.g., from a BS to a UE) and a common UL burst 206 at the end with very limited resources dedicated to UL transmissions (e.g., from a UE to a BS). The timeline also includes a plurality of UL-centric slots 210 (e.g., subframes) that each have a DL symbol 212 at the beginning of the slot, but the remaining symbols 214 of the slot are dedicated to UL transmissions. As seen in the UL slot 210b, the UL symbols 214 may be allocated to various users (e.g., UEs) for a variety of UL transmissions (e.g., OFDM PUSCH, SC-PUSCH, SC-FDM PUCCH, OFDM PUSCH). Similarly, while not shown, the DL symbols 204 of a DL slot 202 may be allocated for a variety of DL transmissions (e.g., PDCCH, PDSCH) to one or more UEs.

Figure 3:
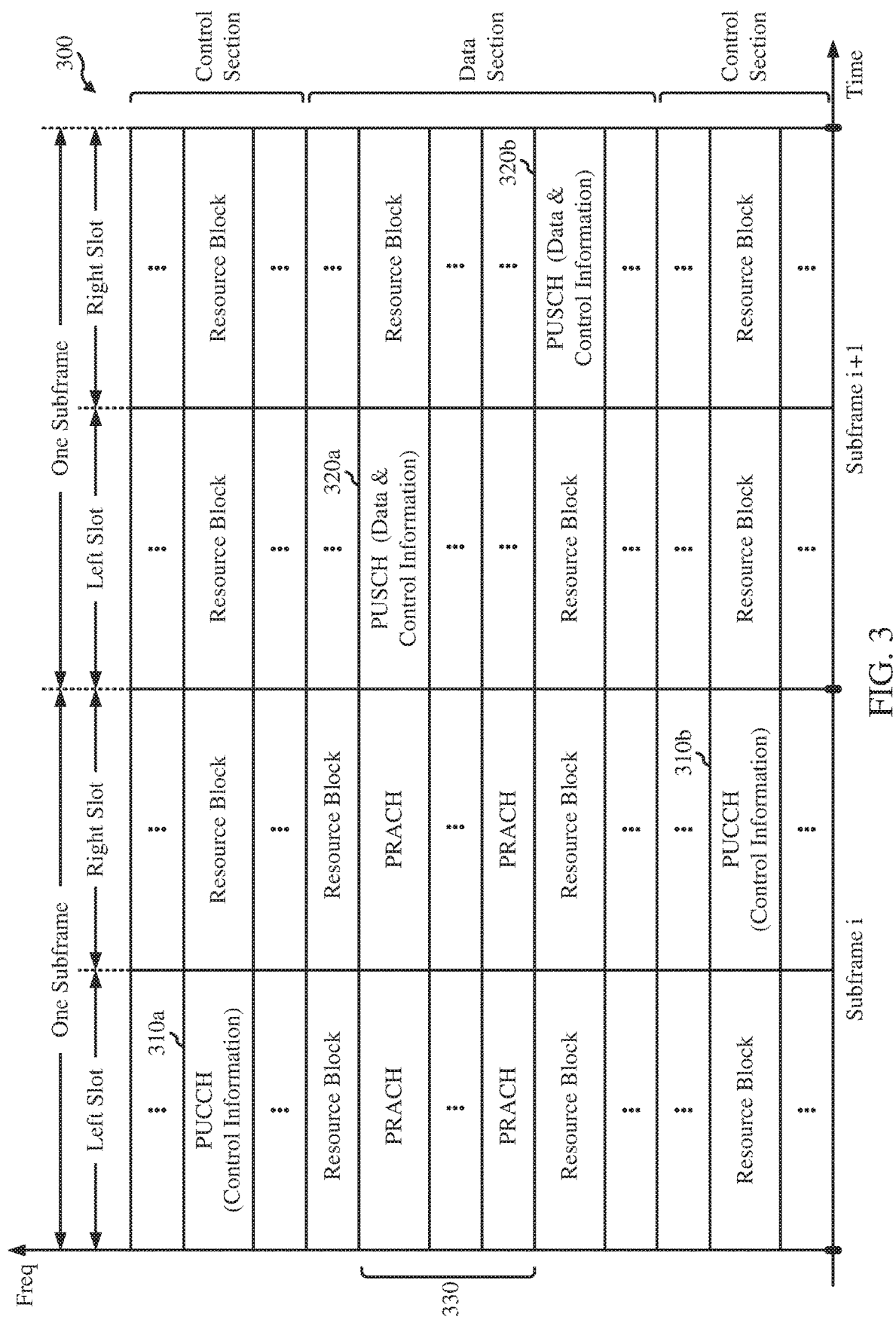
FIG. 3 is a diagram illustrating an example uplink frame structure in a telecommunications system, according to aspects of the present disclosure.

FIG. 3 is a diagram 300 illustrating an example of an uplink (UL) frame structure in a telecommunications system (e.g., LTE). The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 310a, 310b in the control section to transmit control information to a Node B. The UE may also be assigned resource blocks 320a, 320b in the data section to transmit data to the Node B. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 330. The PRACH 330 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 4:
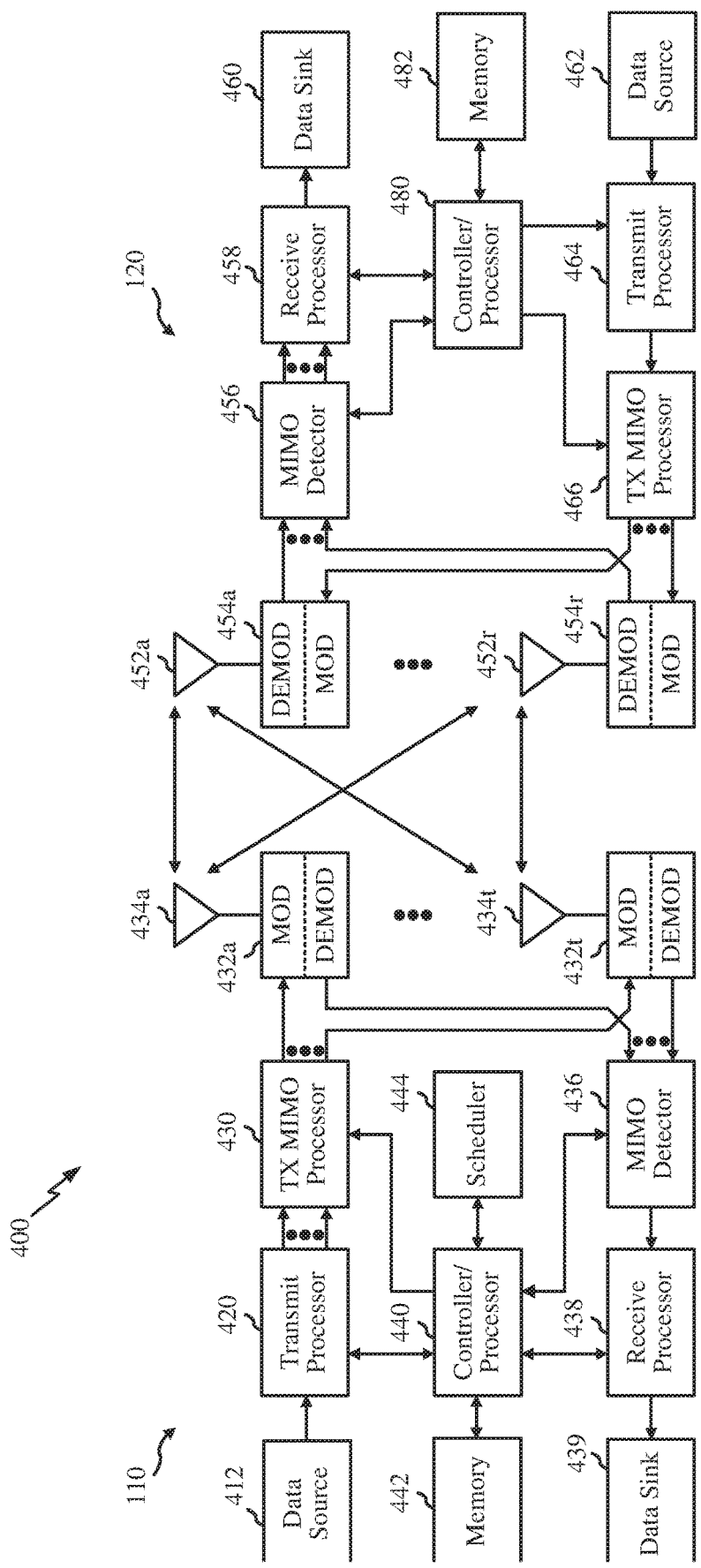
FIG. 4 is a block diagram conceptually illustrating a design of an example Node B and user equipment (UE), according to aspects of the present disclosure.

FIG. 4 illustrates example components of the base station 110 and UE 120 illustrated in FIG. 1, which may be used to implement aspects of the present disclosure. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 5-11. The BS 110 may comprise a TRP.

FIG. 4 shows a block diagram of a design of a base station/Node B/TRP 110 and a UE 120, which may be one of the base stations/Node Bs/TRPs and one of the UEs in FIG. 1. For a restricted association scenario, the base station 110 may be the macro Node B 110c in FIG. 1, and the UE 120 may be the UE120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information e.g., for the PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the base station 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of various processes for the techniques described herein and those illustrated in the appended drawings. The processor 480 and/or other processors and modules at the UE 120 may also perform or direct, e.g., the execution of various processes for the techniques described herein and those illustrated in the appended drawings. A scheduler 444 may schedule UEs for data transmission on the downlink and/or uplink.

Example New Radio Cell Measurement

New radio (NR) may refer to radios configured to operate according to a wireless standard, such as 5G (e.g. wireless network 100). NR may include Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and mission critical targeting ultra reliable low latency communications (URLLC).

NR cell may refer to a cell operating according in the NR network. A NR Node B (e.g., Node B 110) may correspond to one or multiple transmission reception points (TRPs). As used herein, a cell may refer to a combination of downlink (and potentially also uplink) resources. The linking between the carrier frequency of the downlink resources and the carrier frequency of the uplink resources is indicated in the system information (SI) transmitted on the downlink resources. For example, system information can be transmitted in a physical broadcast channel (PBCH) carrying a master information block (MIB).

NR RAN architecture may include a central unit (CU) (e.g., network controller 130). The CU may be an Access node controller (ANC). The CU terminates backhaul interface to RAN-CN, terminates backhaul interface to neighbor RAN node. The RAN may include a distributed unit that may be one or more TRPs that may be connected to one or more ANCs (not shown). TRPs may advertise System information (e.g., Global TRP ID), may include PDCP/RLC/MAC functions, may comprise one or more antenna ports, may be configured to individually (dynamic selection) or jointly (joint transmission), and may serve traffic to the UE.

Example Enchancements to Advanced CSI Reporting Procedures

In 3GPP Release 13 Full-Dimension MIMO (FD-MIMO), an official name for the MIMO enhancement in 3GPP, class A and class B type CSI (Channel State Information) feedback assumes PMI (Pre-Coding Matrix Indicator) constructed from a single DFT beam or single beam selection. Thus, an issue with the legacy CSI reporting is that the legacy CSI reporting is insufficient to reflect channel information, which in turn degrades the SU/MU-MIMO performance, especially at larger antenna arrays.

Advanced CSI (Adv-CSI) reporting is thus proposed in Release 14 to improve CSI accuracy by combining multiple beams (e.g. DFT beams) based on power and/or phasing based codebook.

Generally, Type I feedback includes normal codebook-based PMI feedback with normal spatial resolution, wherein Type II feedback includes enhanced "explicit" feedback and/or codebook-based feedback with higher spatial resolution.

NR agreed CSI feedback is considering advanced CSI feedback at least in Type II feedback.

However, there are some drawbacks associated with advanced CSI reporting including large feedback overhead and increased UE processing complexity as compared to legacy CSI reporting. In certain aspects, these drawbacks are attributed, at least in part, to large codebook sizes utilized for advanced CSI reporting. In certain aspects, UE processing complexity may increase when aperiodic advanced CSI triggering is being used to trigger advanced CSI reports at the UE. In cases when the UE is using aperiodic advanced CSI triggering, the UE first decodes the UL grant to know the presence of aperiodic advanced CSI triggering before calculating the advanced CSI. In certain aspects, UE processing complexity may further increase when advanced CSI is triggered in multiple contiguous subframes where the UE calculates multiple advanced CSIs simultaneously. In an aspect, the multiple contiguous triggers also increase total feedback overhead. In certain aspects, substantial increase in UE processing complexity as well as feedback overhead may be expected when advanced CSI is enabled for a set of serving cells or multiple CSI processes.

Certain aspects of the present disclosure discuss techniques to reduce feedback overhead and/or UE processing complexity by relaxing or limiting one or more parameters associated with reporting advanced CSI.

FIG. 5 illustrates example operations 500 performed, for example, by a UE to enhance advanced CSI reporting procedures, in accordance with certain aspects of the present disclosure. Operations 500 begin, at 502, by receiving at least one trigger message for reporting advanced CSI by the UE. At 504, the UE takes one or more actions to reduce at least one of feedback overhead or processing at the UE associated with the reporting.

Figure 6:
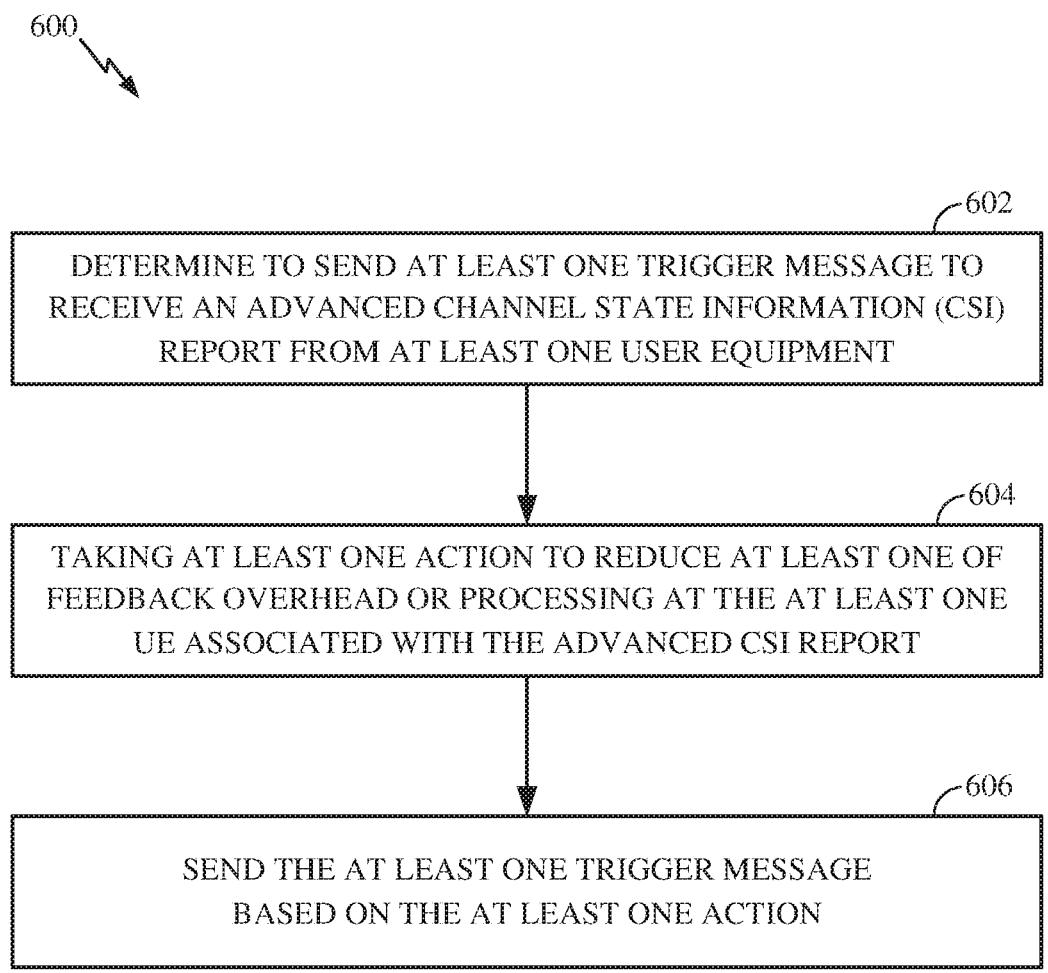
FIG. 6 illustrates example operations 600 performed, for example, by a Base Station (BS) to enhance advanced CSI reporting procedures, in accordance with certain aspects of the present disclosure.

FIG. 6 illustrates example operations 600 performed, for example, by a Base Station (BS) to enhance advanced CSI reporting procedures, in accordance with certain aspects of the present disclosure. Operations 600 begin, at 602, by determining to send at least one trigger message to receive an advanced CSI report from at least one UE. At 604, the BS takes at least one action to reduce at least one of feedback overhead or processing at the at least one UE associated with the advanced CSI report. At 606, the BS sends the at least one trigger message based on the at least one action.

In certain aspects, requirements for an uplink data channel (e.g., PUSCH processing) may be relaxed when advanced CSI is scheduled/triggered. In other words, advanced CSI may be subject to uplink data channel limitations and triggering advanced CSI may be subject to limitations to uplink data transmission e.g., PUSCH limitations). In an aspect, this helps decrease overhead on the uplink.

In an aspect, advanced CSI reporting only without simultaneous uplink data transmission (e.g., PUSCH in the same subframe as A-CSI) is allowed, for example, when no uplink data is scheduled. In an aspect, uplink data transmission (e.g., PUSCH) is not allowed together with advanced CSI reporting. Thus, either advanced CSI only or UL data transmission only is scheduled at one time. For example, a base station will not schedule an advanced CSI report and uplink data transmission at the same time (e.g., in the same subframe).

In an aspect, advanced CSI, transmission on an uplink shared channel (e.g., PUSCH), or a combination thereof is not triggered by a DCI format that supports multi-antenna port transmission. For example, advanced CSI and/or PUSCH transmission is triggered by DCI format 0 (single port transmission) but not allowed to be triggered by DCI format 4 (e.g., multiple antenna port transmission). In an aspect, advanced CSI reporting and PUSCH transmission may be allowed at one time by limiting to single port transmission.

In an aspect, only rank 1 is allowed for advanced CSI, PUSCH, or a combination thereof. In an aspect, UL-MIMO is not allowed to trigger advanced CSI. In an aspect, advanced CSI reporting and PUSCH transmission may be allowed at one time by limiting to rank 1 only.

In an aspect, the maximum Transport Block Size (TBS) is limited for uplink transmissions (e.g., advanced CSI reports and/or UL data) for joint advanced CSI and uplink data transmission another aspect, an MCS is limited for uplink transmissions (e.g., advanced CSI reports and/or UL data) to a given set of MCSs for joint advanced. CSI and uplink data transmission. Thus, in some cases, uplink data transmission may be allowed along with advanced CSI reports if the TBS and or MCS of uplink transmission is limited.

In certain aspects, a payload size for advanced CSI may be reduced subject to PUSCH resource limitation. For example, quantization levels and/or subband size for advanced CSI may be reduced to reduce the payload size. In an aspect, using a reduced subband size for reporting advanced CSI reduces the payload size and complexity at the UE.

In certain aspects, advanced CSI reporting may be subject to CSI process limitations. In an aspect, a UE may support a first number of CSI processes for legacy CSI reporting and a second, lesser, number of CSI processes for advanced CSI reporting to reduce feedback overhead and/or UE processing complexity. For example, the UE may support $N_x$ (e.g., 32) CSI processes for legacy CSI reporting and may support Ny (e.g., 3) CSI processes for advanced CSI reporting. Generally $N_y<N_x$. In certain aspects, for advanced CSI reporting the $N_x-N_y$ CSI processes may be handled in multiple ways and may be configured and indicated by the base station. For example, the UE may fallback to legacy CSI (e.g., Type I CSI in NR or Release 10 codebook in LTE) for one or more CSI processes, the UE may use outdated advanced CSI (e.g., feedback previous advanced CSI reported for the same CSI process), skip reporting the advanced CSI, or report a subsampled codebook of advanced CSI (e.g., subsampling on the beam basis numbers, subsampling on quantization levels) that reduce codebook size and complexity. In an aspect, this configuration may be static or semi-statically indicated by the base station.

Figure 7:
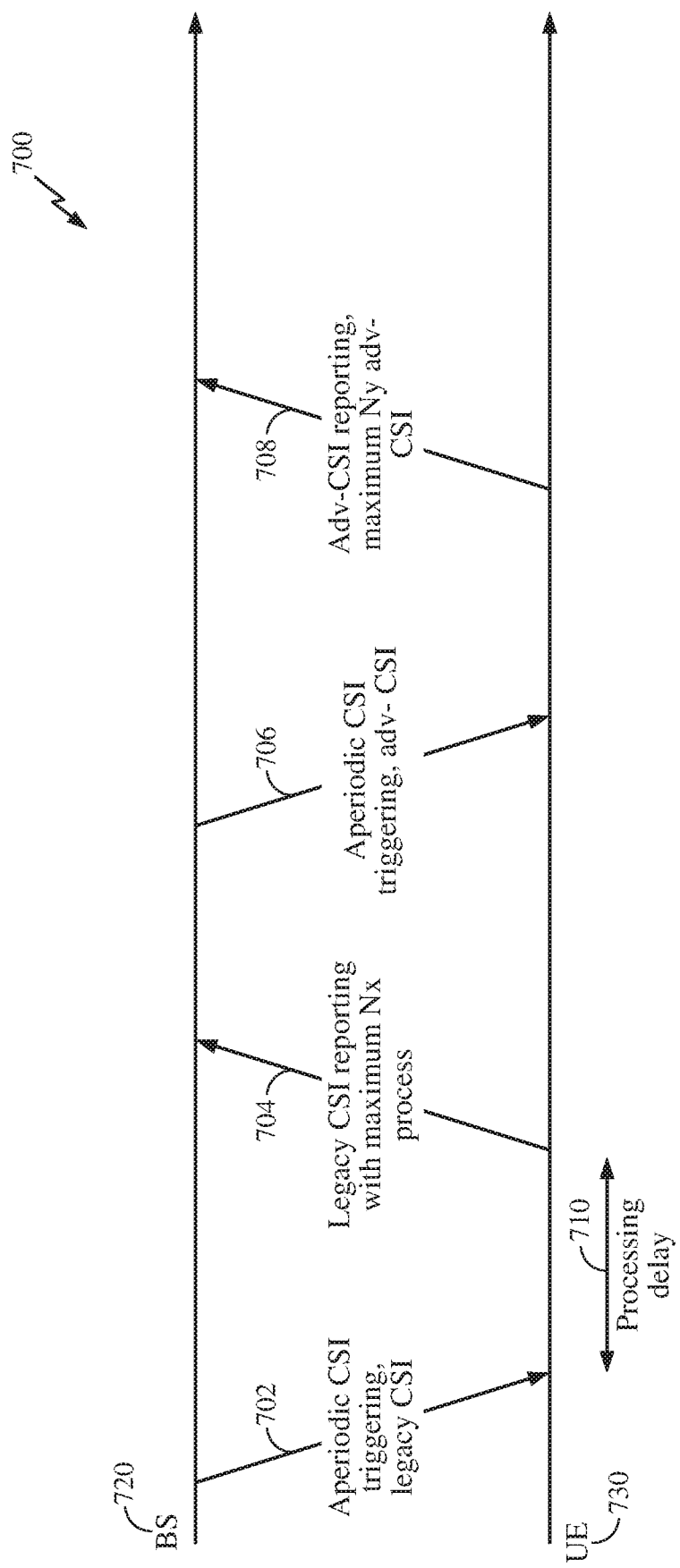
FIG. 7 illustrates example 700 for limiting CSI processes for advanced CSI reporting, in accordance with certain aspects of the present disclosure.

FIG. 7 illustrates example 700 for limiting CSI processes for advanced CSI reporting, in accordance with certain aspects of the present disclosure. Example 700 illustrates signaling being exchanged between a BS 720 and UE 730 for advanced CSI reporting by the UE 730. As shown, the BS 720 triggers aperiodic legacy CSI reporting at 702. In an aspect, the trigger for the legacy CSI reporting includes CSI triggers for multiple CSI processes. In response, after a processing delay 710, the UE 730 reports legacy CSI for a maximum of $N_x$ CSI processes. At 706, the BS 720 triggers aperiodic advanced CSI that may include CSI triggers for multiple CSI processes. In response, at 708, the UE 730 reports advanced CSI for a maximum of $N_y$ CSI processes. As noted above, $N_y<N_x$.

In an aspect, the UE 730 reports the maximum supported CSI processes corresponding to legacy CSI and advanced CSI to the BS 720 as part of UE capability information. In certain aspects, the BS 720 receives the UE capability information and adjusts triggering of advanced CSI based on the received information. For example, the BS 720 does not trigger advanced CSI reports for more than $N_y$ CSI processes at one time.

On the other hand, the BS may not be aware of the maximum number of CSI processes supported by the UE for advanced CSI reporting and may trigger advanced. CSI reports for more than the number of CSI processes supported by the UE. In cases where the UE receives advanced CSI triggers for more than the supported number of CSI processes, the UE calculates or updates advanced CSI for the supported number of CSI processes and may handle CSI triggers for the remaining CSI processes as discussed above. For example, the UE may fallback to legacy CSI (e.g., Type I CSI in NR or Release 10 codebook in LTE) for one or more of the CSI processes, the UE may use outdated advanced CSI (e.g., feedback previous advanced CSI reported for the same CSI process), skip reporting the advanced CSI, or report a subsampled codebook of advanced CSI (e.g., subsampling on the beam basis numbers, subsampling on quantization levels) that reduce codebook size and complexity.

In certain aspects, a maximum number of CSI processes for advanced CSI reporting $N_{adv\text{-}CSI}$ may take values from a set of values, for example, $N_{adv\text{-}CSI}=\{1,3,4\}$. In an aspect, this set of supported values for the maximum number of supported CSI processes for advanced CSI reporting may be transmitted by the UE as part of UE capability signaling to one or more base stations including a serving base station.

In an aspect, if $N_{adv\text{-}CSI}=1$, then the UE is not expected to receive advanced CSI triggers or update advanced CSI if there is a pending CSI process for the advanced CSI. If $N_{adv\text{-}CSI}=\{3,4\}$, it means that the UE supports multiple advanced CSI processes. In this case, the UE may process advanced CSI related CSI processes unless the requested advanced CSI related CSI process exceeds $N_{adv\text{-}CSI}$ CSI processes. For CSI processes whose advanced CSI may not be updated since the maximum supported CSI processes are already being processed, the UE may choose to process the advanced CSIs corresponding to these CSI processes in one or more ways as noted above, for example, based on a pre-determined configuration. For example, the UE may fallback to legacy CSI (e.g., Type I CSI in NR or Release 10 codebook in LTE) for one or more of the CSI processes, the UE may use outdated advanced CSI (e.g., feedback previous advanced CSI reported for the same CSI process), skip reporting the advanced CSI, or report a subsampled codebook of advanced CSI (e.g., subsampling on the beam basis numbers, subsampling on quantization levels) that reduce codebook size and complexity.

In certain aspects, advanced CSI corresponding to a particular CSI process is considered under processing until the advanced CSI has been reported for the CSI process.

Figure 8:
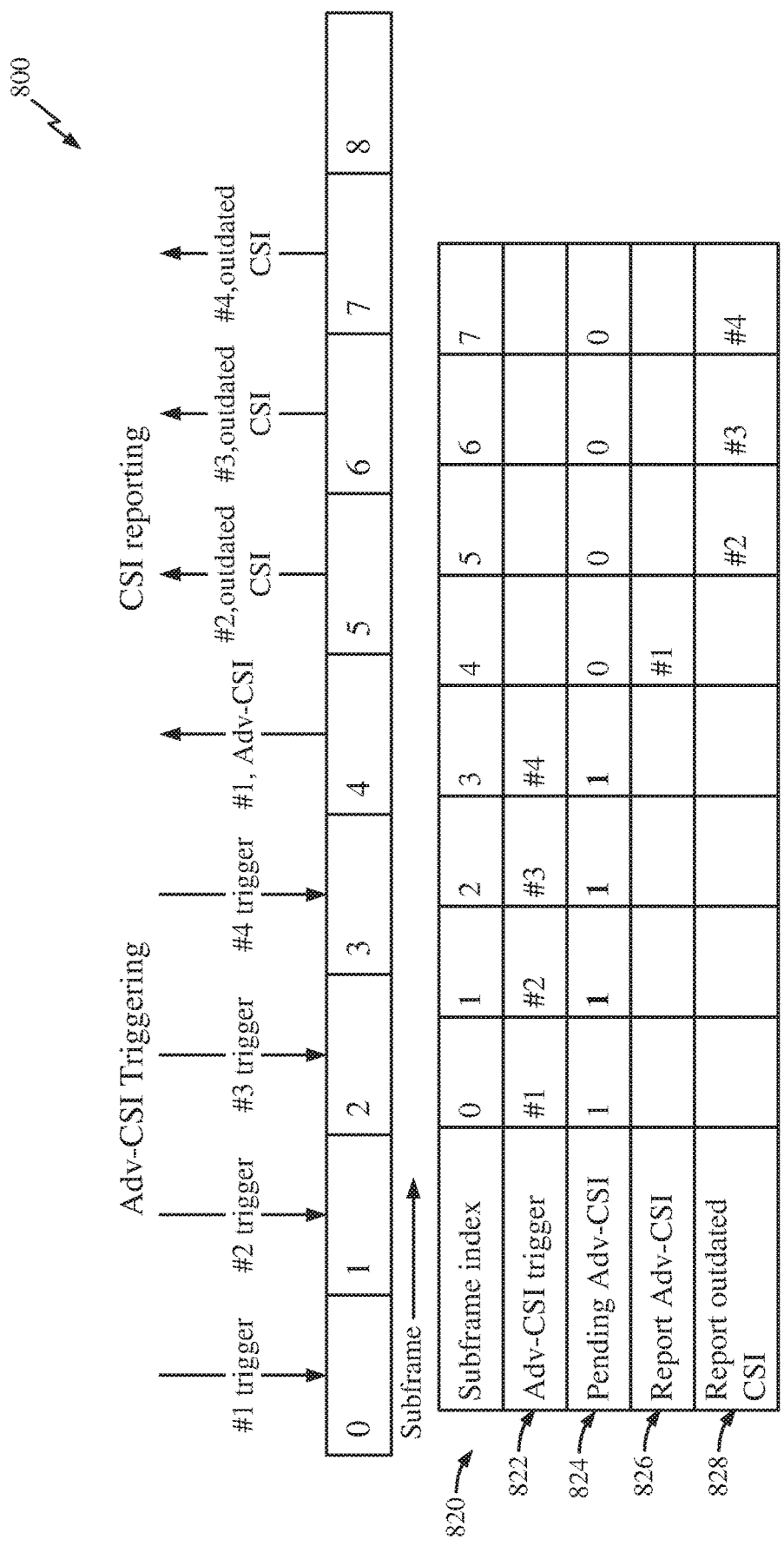
FIG. 8 illustrates example advanced CSI reporting 800 when the UE supports one CSI process for advanced CSI reporting, in accordance with certain aspects of the present disclosure.

FIG. 8 illustrates example advanced CSI reporting 800 when the UE supports one CSI process for advanced CSI reporting, in accordance with certain aspects of the present disclosure. FIG. 8 shows advanced CSI triggering and corresponding reporting over 8 TTIs (Transmission Time Intervals). In an aspect, each TTI corresponds to a 1 ms subframe. The example CSI reporting 800 of FIG. 8 assumes a UE processing delay of 4 TTIs or 4 ms, which means that the UE takes 4 TTIs or 4 ms to process and report advanced CSI after a corresponding trigger is received. However, the UE processing delay may vary depending on various factors including a particular UE's processing capability.

As shown in FIG. 8, the UE receives triggers 1-4 in subframes 0-3 respectively for triggering advanced CSI reports, each trigger 1-4 corresponds to a different CSI process. For example, as shown, triggers 1-4 correspond to CSI processes 1-4 respectively. Table 820 shows how, over subframes 0-8, advanced CSI is processed and reported out based on the received triggers 1-4 and UE capability, for example, the supported number of CSI processes for advanced CSI reporting. Row 822 shows the advanced CSI triggers received by the UE on a subframe by subframe basis. Row 824 shows the total number of advanced CSI processes pending in each subframe, i.e., the total number of CSI processes for which advanced CSIs are being currently processed in a subframe. Row 826 shows advanced CSI corresponding to which CSI process is reported out in each subframe. Row 828 shows outdated CSI corresponding to which CSI process is reported out in each subframe.

As shown FIG. 8, since the UE takes 4 ms or 4 subframes to process each CSI trigger, the UE processes CSI trigger 1 corresponding to CSI process 1 in subframes 0-3. As shown in table 820, row 824, one CSI process is pending in subframes 0-3, meaning that the UE is processing advanced CSI in subframes 0-3 corresponding to CSI trigger 1 received in subframe 1 for CSI process 1. In the meantime the UE receives CSI triggers in subframes 2, 3, and 4 corresponding to CSI processes 2-4. However, since the UE only supports one CSI process at one time, the UE does not process advanced CSIs for CSI processes 2-4. Thus, only one CSI process remains pending in subframes 1-3, even though multiple other triggers corresponding to other CSI processes have been received.

As shown in row 826, the UE reports an updated advanced CSI in subframe 4 corresponding to CSI process 1, 4 subframes after receiving trigger 1 in subframe 0. However, since the UE did not process triggers 2-4 corresponding to CSI processes 2-4, the UE does not have updated CSIs to report for the CSI processes 2-4. As shown in row 828, the UE chooses to report outdated (e.g., previously determined) advanced CSIs corresponding to CSI processes 2-4 in subframes 5-7 respectively.

As noted above, a CSI process is considered pending until an advanced CSI corresponding to the CSI process is reported out. Thus, as and when advanced CSIs are reported out for each CSI process, the pending CSI processes are decremented. For example, when advanced CSI corresponding to CSI process 1 is reported out in subframe 4, the pending CSI processes is decremented from 1 to 0 CSI process as shown in subframe 4. In an aspect, the UE may start processing another CSI process when advanced CSI corresponding to a CSI process is reported out.

Figure 9:
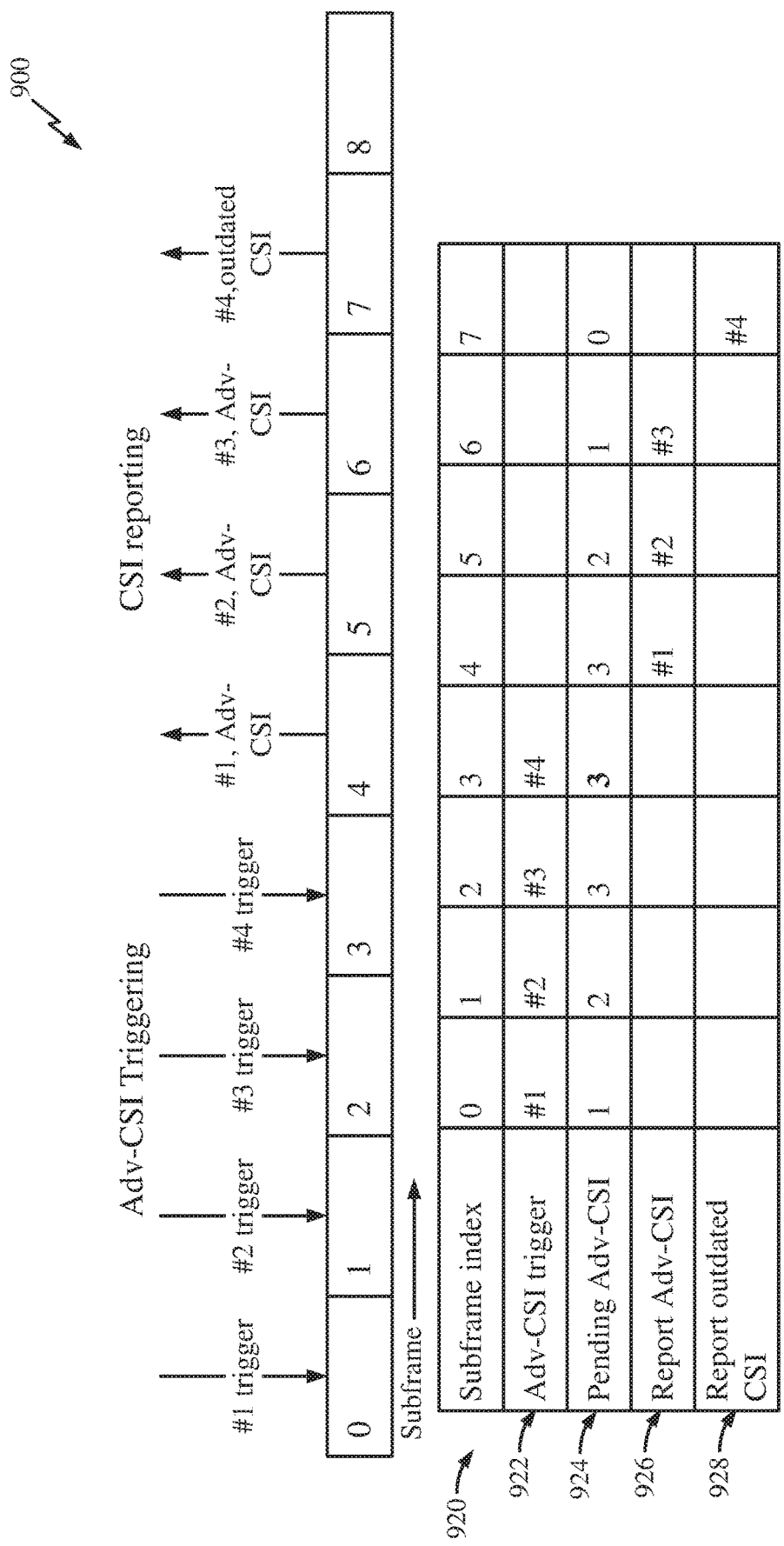
FIG. 9 illustrates example advanced CSI reporting 900 when the UE supports three CSI processes for advanced CSI reporting, in accordance with certain aspects of the present disclosure.

FIG. 9 illustrates example advanced CSI reporting 900 when the UE supports three CSI processes for advanced CSI reporting, in accordance with certain aspects of the present disclosure. FIG. 9 shows advanced CSI triggering and corresponding reporting over 8 TTIs (Transmission Time Intervals). In an aspect, each TTI corresponds to a 1 ms subframe. The example CSI reporting 900 of FIG. 9 assumes a UE processing delay of 4 TTIs or 4 ms, which means that the UE takes 4 TTIs or 4 ms to process and report advanced CSI after a corresponding trigger is received. However, the UE processing delay may vary depending on various factors including a particular UE's processing capability.

As shown in FIG. 9, the UE receives triggers 1-4 in subframes 0-3 respectively for triggering advanced CSI reports, each trigger 1-4 corresponds to a different CSI process. For example, as shown, triggers 1-4 correspond to CSI processes 1-4 respectively. Table 920 shows how, over subframes 0-8, advanced CSI is processed and reported out based on the received triggers 1-4 and UE capability, for example, the supported number of CSI processes for advanced CSI reporting. Row 922 shows the advanced CSI triggers received by the UE on a subframe by subframe basis. Row 924 shows the total number of advanced CSI processes pending in each subframe, i.e., the total number of CSI processes for which advanced CSIs are being currently processed in a subframe. Row 926 shows advanced CSI corresponding to which CSI process is reported out in each subframe. Row 928 shows outdated CSI corresponding to which CSI process is reported out in each subframe.

Since the UE supports three CSI processes at one time, the UE starts processing advanced CSIs corresponding to triggers 1-3 when they are received in subframes 1-3 respectively. Since the UE takes 4 ms or 4 subframes to process each CSI trigger, the UE processes each of the triggers 1-3 for 4 subframes after they are received. For example, the UE processes advanced CSI in subframes 0-3 corresponding to CSI trigger 1 received in subframe 1 for CSI process 1. Similarly, the UE processes advanced CSIs corresponding to CSI triggers 2 and 3 in subframes 1-4 and 2-5 respectively. As shown in table 920, row 924, only one CSI process is pending in subframe 0 when the UE starts processing trigger 1, 2 CSI processes are pending in subframe 1 when the UE starts processing trigger 2, and 3 CSI processes are pending in subframe 2 when the UE starts processing trigger 3. However, since the UE supports only three CSI processes at one time, trigger 4 corresponding to CSI process 4 is not processed.

As shown in row 926, the UE reports updated advanced CSIs in subframes 4, 5, and 6 corresponding to CSI processes 1, 2, and 3, 4 subframes after receiving each corresponding trigger in subframes 0-3. However, since the UE did not process trigger 4 corresponding to CSI process 4, the UE does not have updated CSI to report for the CSI processes 4. As shown in row 928, the UE chooses to report an outdated (e.g., previously determined) advanced CSI corresponding to CSI processes 4 in subframes 7.

As noted above, a CSI process is considered pending until an advanced CSI corresponding to the CSI process is reported out. Thus, as shown in row 924, as and when advanced CSIs are reported out for each CSI process, the pending CSI processes decremented. For example, when advanced CSI corresponding to CSI process 1 is reported out in subframe 4, the pending CSI processes is decremented from 3 to 2 CSI processes as shown subframe 5, and so on. In an aspect, the UE may start processing one additional CSI process when advanced CSI corresponding to a CSI process is reported out.

In certain aspects, to relieve UE processing and in some cases feedback overhead, a UE may not be required to update its advanced CSI reporting for a given CSI process or a set of CSI processes, for a given time period (e.g., X ms). For example, the UE may not update advanced CSI corresponding to a CSI process for Xms after advanced CSI corresponding to the CSI process was last updated. In certain aspects, the time period X may be configured to be different for different CSI processes or sets of CSI processes. For example, $X=10$ ms for CSI process (or set of CSI processes) A and $X=5$ ms for CSI process (or set of CSI process) B. In an aspect, X is semi-statically configured by signaling, for example, from a base station.

Figure 10:
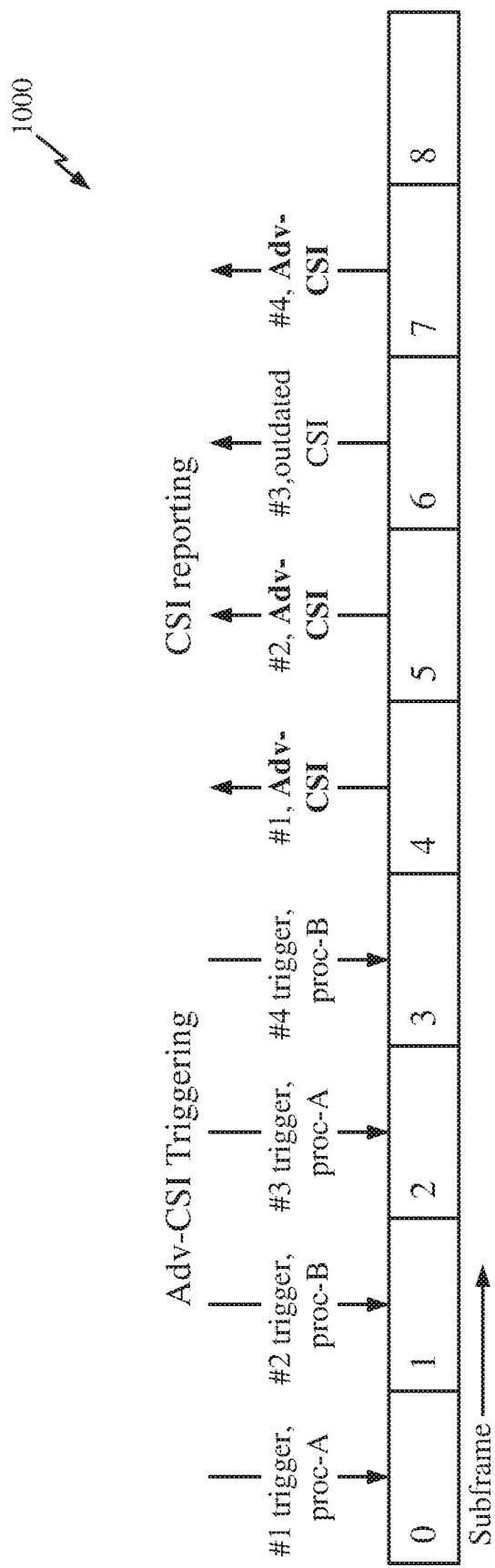
FIG. 10 illustrates example advanced CSI reporting 1000 for different CSI processes with different configured updating time periods, in accordance with certain aspects of the present disclosure.

FIG. 10 illustrates example advanced CSI reporting 1000 for different CSI processes with different configured updating time periods, in accordance with certain aspects of the present disclosure. FIG. 10 shows advanced CSI triggering and corresponding reporting over 8 TTIs (Transmission Time Intervals). In an aspect, each TTI corresponds to a 1 ms subframe. The example CSI reporting 1000 of FIG. 10 assumes a UE processing delay of 4 TTIs or 4 ms, which means that the UE takes 4 TTIs or 4 ms to process and report advanced CSI after a corresponding trigger is received. However, the UE processing delay may vary depending on various factors including a particular UE's processing capability.

As shown the UE receives triggers 1 and 3 corresponding to CSI process A in subframes 0 and 2 respectively. The UE also receives triggers 2 and 4 corresponding to CSI process B in subframes 1 and 3 respectively. This example assumes that the updating time period for CSI process A is $X=5$ ms, and the updating time period for CSI process B is $X=1$ ms. This means that the UE will not update advanced CSI for CSI process A, for 5 ms after a previous advanced. CSI update. Also, the UE will not update advanced CSI for CSI process B, for 1 ms after a previous advanced CSI update.

As shown in FIG. 10 the UE reports an updated advanced CSI in subframe 4, corresponding to CSI trigger 1 received in subframe 0 for CSI process A. The UE also reports an updated advanced CSI in subframe 5, corresponding to CSI trigger 2 received in subframe 1 for CSI process B. However, the CSI trigger 3 received in subframe 2 for CSI process A is only 2 ms away from the previous trigger received in subframe 0 for CSI process A, which is less than $X=5$ ms set for CSI process A. Thus, the UE does not update the advanced CSI for CSI process A corresponding to trigger 3 received in subframe 2. Instead, as shown, the UE reports an outdated (e.g., previously determined) advanced CSI for CSI process A in subframe 6, corresponding to trigger 3.

The CSI trigger 4 received in subframe 3 for CSI process B is only 2 ms away from the previous trigger received for CSI process B in subframe 1, which is 2 ms away from the previous trigger received for CSI process B in subframe 1, which is higher than the update time period $X=1$ ms set for CSI process B. Thus, the UE is able to update the advanced CSI process again corresponding to trigger 4, and report out another updated advanced CSI for CSI process B in subframe 7.

In certain aspects, in order to relax requirements with respect to advanced CSI, advanced CSI reporting may be subject to Rank Indication (RI) reporting periodicity. In certain aspects, a UE upon reception of an aperiodic CSI report request triggering an advanced CSI report in uplink subframe n is not expected to update RI corresponding to the CSI process if RI for the advanced CSI of the associated CSI process has been reported and updated on or after subframe n-X. In an aspect, X is predefined (e.g., 5 subframes) or semi-statically configured via signaling from a network.

In 5G NR, self-contained subframe was introduced to reduce Round Trip Time (RTT). In certain aspects, CSI may be configured with self-contained subframes or non-self-contained subframes. For self-contained subframes, CSI triggering and corresponding CSI reporting is included in the same subframe. For non-self-contained subframes, CSI triggering and corresponding CSI reporting may be in different subframes, i.e., advanced CSI is cross-subframe scheduled.

In certain aspects, in order to relax computation complexity at the UE, advanced CSI may be reported using only non-self-contained subframes.

Figure 11:
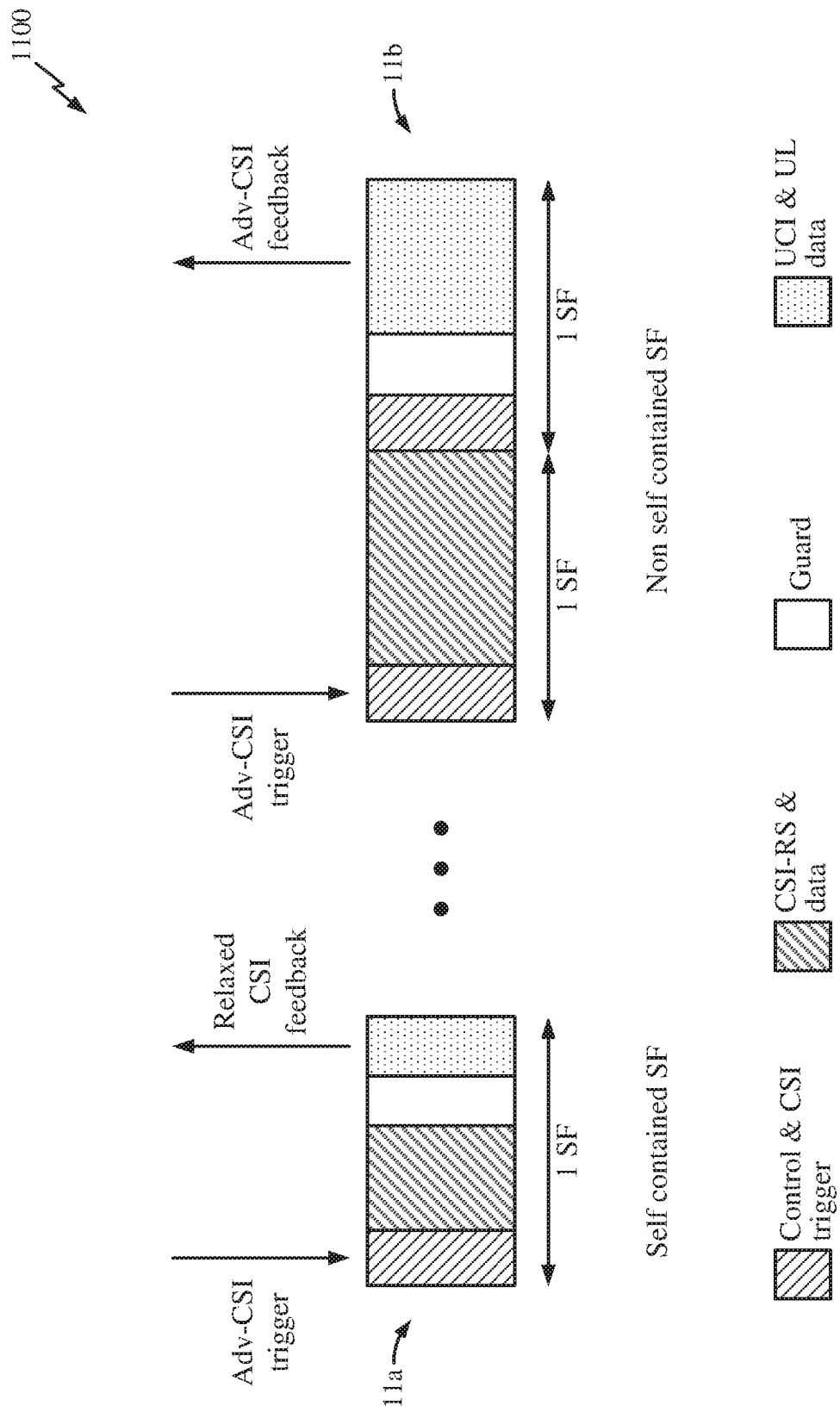
FIG. 11 illustrates example advanced CSI reporting using non-self-contained subframes, in accordance with certain aspects of the present disclosure.

FIG. 11 illustrates example advanced CSI reporting using non-self-contained subframes, in accordance with certain aspects of the present disclosure. 11a shows a self-contained subframe and 11b shows two consecutive non-self-contained subframes. As shown in 11a, advanced CSI is triggered in the self-contained subframe, but advanced CSI feedback is relaxed, which means the UE does not report an updated advanced CSI corresponding to the trigger in the same self-contained subframe. Instead, in an aspect, the UE may, for example, report an outdated (previously determined) advanced CSI or not report a CSI at all. Also, the UE may fall back to legacy CSI reporting. (For example, type I CSI in NR or release 10 codebook in LTE), In addition, the UE may report a subsampled codebook of adv-CSI subsampling on the beam basis numbers, subsampling on quantization levels) that can reduce codebook size and complexity. Thus, multiple options of Adv-CSI relaxation are configurable and the configuration can be static or semi-static and may be indicated by the base station. As shown in 11b, the trigger is received in the first subframe and the advanced CSI corresponding to the trigger is reported in the second subframe, thus relaxing processing requirement upon the UE.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later conic to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PI-IY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product/computer readable medium for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a User Equipment (UE), comprising:
    receiving at least one trigger message for reporting advanced Channel State Information (CSI) by the UE; and
    taking one or more actions to reduce at least one of feedback overhead or processing at the UE associated with the reporting, wherein taking the one or more action comprises reducing a payload size of the advanced CSI report based on a physical uplink shared channel (PUSCH) resource limitation.

2. The method of claim 1, wherein taking the one or more actions comprises not allowing transmission of data on the uplink together with the reporting the advanced CSI.

3. The method of claim 1, wherein taking the one or more actions comprises not reporting the advanced CSI in response to a trigger message received via a DCI (Downlink Control Information) format supporting multi-antenna port transmission.

4. The method of claim 1, wherein taking the one or more actions comprises not reporting the advanced CSI in response to a trigger message indicating a rank exceeding a given rank.

5. The method of claim 1, wherein taking the one or more actions comprises reporting the advanced CSI using a Modulation and Coding Scheme (MCS) from a given set of MCSs.

6. The method of claim 1, wherein taking the one or more actions comprises reporting the advanced CSI with a reduced payload size.

7. The method of claim 1, wherein taking the one or more actions comprises supporting a given number of triggered CSI processes for the advanced CSI, the given number of CSI processes being less than a number of triggered CSI processes supported for legacy CSI.

8. The method of claim 7, wherein receiving the at least one trigger message comprises receiving a plurality of trigger messages, each trigger message triggering advanced CSI reporting corresponding to a different CSI process.

9. The method of claim 8, wherein taking the one or more actions further comprising simultaneously processing the supported given number of CSI processes at one time.

10. The method of claim 9, wherein taking the one or more actions further comprising reporting a previously determined advanced CSI for one or more CSI processes, if the supported number of CSI processes are being processed.

11. The method of claim 1, wherein taking the one or more actions comprises not updating the advanced CSI corresponding to one or more CSI processes for a given time period after a previous update of the advanced CSI was completed.

12. The method of claim 1, wherein taking the one or more actions comprises, if the advanced CSI report is triggered in subframe n corresponding to a CSI process, not updating a Rank Indicator (RI) associated with the CSI process if the RI for the advanced CSI associated with the CSI process was updated on or after X number of subframes before subframe n.

13. The method of claim 1, wherein taking the one or more actions comprises not reporting the advanced CSI in one or more subframes that require that the advanced CSI is reported in the same subframe in which a corresponding CSI trigger was received.

14. A method for wireless communication by a Base Station (BS), comprising:

determining to send at least one trigger message to receive an advanced Channel State Information (CSI) report from at least one User Equipment (UE):

taking at least one action to reduce at least one of feedback overhead or processing at the at least one UE associated with the advanced CSI report, wherein taking the one or more action comprises reducing a payload size of the advanced CSI report based on a physical uplink shared channel (PUSCH) resource limitation;

sending the at least one trigger message based on the at least one action; and receiving the advanced CSI report in response to the at least one trigger message.

15. The method of claim 14, wherein taking the at least one action comprises determining not to schedule the advanced CSI report together with transmission of data on the uplink by the at least one UE.

16. The method of claim 14, wherein taking the at least one action comprises determining not to send the trigger message via a DCI (Downlink Control Information) format supporting multi-antenna port transmission.

17. The method of claim 14, further comprising receiving a maximum number of triggered CSI processes supported by the at least one UE for advanced CSI reports, wherein the maximum number of triggered CSI processes supported by the at least one UE for the advanced CSI reports is less than a number of triggered CSI processes supported for legacy CSI reports.

18. The method of claim 14, further comprising sending an indication of a given time period to the at least one UE.

19. The method of claim 14, wherein taking the at least one action comprises determining to send the trigger message in a subframe to tligger the advanced CSI report in a different subframe.

20. An apparatus for a base station (BS), comprising:

a memory; and a processor in communication with the memory, wherein the processor is configured to:

determine to send at least one trigger message to receive an advanced Channel State Information (CSI) report from at least one User Equipment (UE):

take at least one action to reduce at least one of feedback overhead or processing at the at least one UE associated with the advanced CSI report, wherein taking the one or more action comprises reducing a payload size of the advanced CSI report based on a physical uplink shared channel (PUSCH) resource limitation; and send the at least one trigger message based on the at least one action; and receive the advanced CSI report in response to the at least one trigger message.

21. An apparatus for a user equipment (UE), comprising: a memory; and a processor in communication with the memory, wherein the processor is configured to:

receive at least one trigger message for reporting advanced Channel State Information (CSI) by the UE; and take one or more actions to reduce at least one of feedback overhead or processing at the UE associated with the reporting, wherein taking the one or more action comprises reducing a payload size of the advanced CSI report based on a physical uplink shared channel (PUSCH) resource limitation.

* * * * *